United States Patent

[11] 3,600,000

[72] Inventors Kjell Bergstrom
Dobelnsgatan 22B;
Hakan Jorulf, Murklevagen 29, both of
Uppsala, Sweden
[21] Appl. No. 808,741
[22] Filed Mar. 20, 1969
[45] Patented Aug. 17, 1971
[32] Priority Mar. 21, 1968
[33] Sweden
[31] 3792/68

[54] SECURITY DEVICE FOR SLED
3 Claims, 7 Drawing Figs.
[52] U.S. Cl. ........................................................ 280/18
[51] Int. Cl. ..................................................... B62b 13/04
[50] Field of Search ............................................ 280/18, 12, 19, 22; 9/310

[56] References Cited
UNITED STATES PATENTS

| | | | |
|---|---|---|---|
| 1,530,405 | 3/1925 | Perrin | 280/87.02 W |
| 3,479,046 | 11/1969 | Thompson | 280/18 |
| 2,531,946 | 11/1950 | Parker | 280/18 |
| 2,826,423 | 3/1958 | Erickson | 9/310 |
| 2,829,902 | 4/1958 | Stocker | 280/18 |
| 3,199,887 | 8/1965 | McKelvey | 280/18 |
| 3,276,784 | 10/1966 | Anderson | 9/310 |
| 3,384,910 | 5/1968 | Heston, Jr. et al. | 9/310 |

FOREIGN PATENTS

| 116,660 | 9/1964 | Norway | 280/18 |
|---|---|---|---|

Primary Examiner—Leo Friaglia
Assistant Examiner—Robert R. Song
Attorney—Parrott, Bell, Seltzer, Park & Gibson ABSTRACT: A security arrangement in and for a sled of the type to be used by small children, comprising an integral or attached hump portion forcing the occupant of the sled to sit with the legs flexed thereby to eliminate the risk of fractures due to longitudinal thrusts.

PATENTED AUG 17 1971  3,600,000

INVENTORS.
KJELL BERGSTROM
and HAKAN JORULF
BY Parrott, Bell, Seltzer, Park & Gibson
ATTORNEYS

SECURITY DEVICE FOR SLED

The present invention refers to a device to be used in sleds and intended to reduce the risk of body injuries for children riding the sled down a slope.

The development of cheap mass-produced utensils for coasting down a slope has passed from an initial state in which pieces of cardboard or wallboard have been used via a period during which circular metal disks (so-called "flying saucers") have had widespread use to the present state in which the elongated rectangular toboggan type of sled in various embodiments is dominating. Such sleds are made of plastic material and are generally provided with bottom ridge acting as runners whereby the sled will move downhill in a comparatively straight course and at a high speed. Certain models of such plastic sleds may be provided with steering and braking means, however, the type normally sold is merely a rectangular plastic sled lacking provisions for steering or braking. Thus, children will often be unable to avoid collisions with obstacles or other children by steering or braking the sled. Due to the fact that the child normally is sitting in the rear part of the sled with the legs straightened a collision or overturning will cause a heavy thrust to act in the longitudinal direction of the legs which at the same time are overstretched in the knee joint. If the thrust is sufficiently strong, it will cause a transverse fracture of the femoral (thigh) bone, generally in the lower part thereof, the so-called metaphysis, the lower fragment being more or less flexed forwardly and possibly displaced. The same type of injury may also occur in the lower leg. Other types of injuries observed are a luxation of the hip joint caused by a similar type of violence, fracture of vertebral bodies due to jumps caused by unevenness of the track, the downstroke producing a powerful thrust longitudinally of the vertebral column, cold injuries due to heat transfer through the plastic bottom of the sled and damage done to children knocked down by sleds. In addition to the fact that the fractures caused by a thrust longitudinally of the leg are located within the growth range of the leg whereby future growth of the leg may be impaired, thrusts acting in the longitudinal direction of the vertebral column due to bumps encountered by the sled may give rise to states of paralysis involving a very considerable degree of disablement.

The above-mentioned drawbacks and risks observed in connection with the use of sleds of conventional type are eliminated in sleds constructed according to the present invention involving a considerable reduction of the risk of body injury in connection with sled riding.

It is an object of the invention to provide an arrangement in a plastic sled comprising a hump provided in the bottom of the sled, said hump being so positioned in relation to the seat region of the sled that even the tallest rider who in the absence of said hump could be seated within the sled with the legs straightened, will be forced to bend the legs in the knee joint.

Further objects of and advantages obtained by the invention will appear from the subsequent description of some embodiments of the invention illustrated in the enclosed drawings in which:

FIG. 6 is a transverse section through the side edge of a sled provided with an edge strip of rubber or the like.

Figure 1:
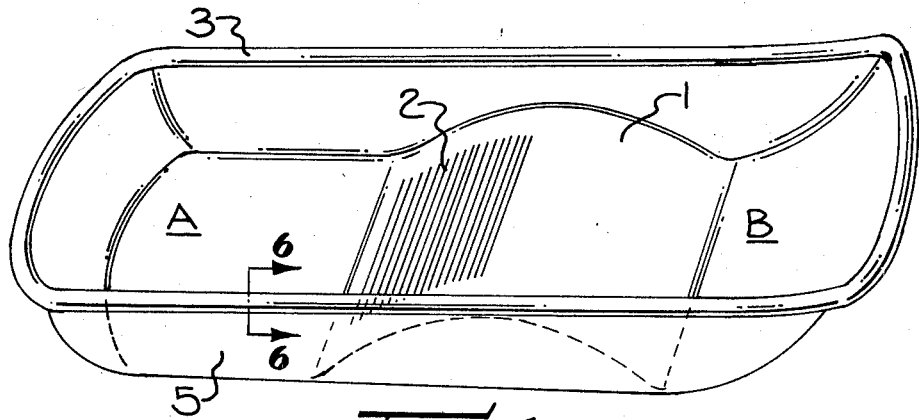
FIG. 1 is a perspective view of a sled according to the present invention.
Figure 2:
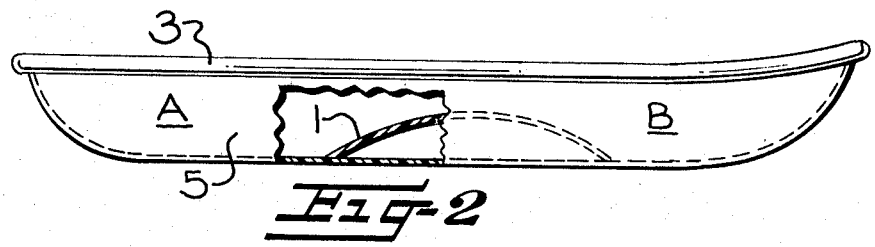
FIG. 2 is a side elevation of the sled shown in FIG. 1 with a portion broken away and with parts shown in section.
Figure 3:
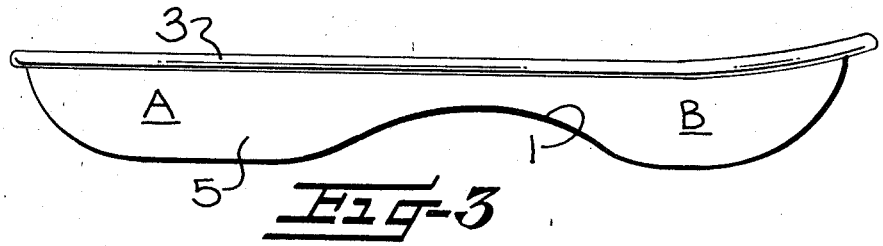
FIG. 3 is a side elevation of a modified embodiment of the sled.
Figure 4:
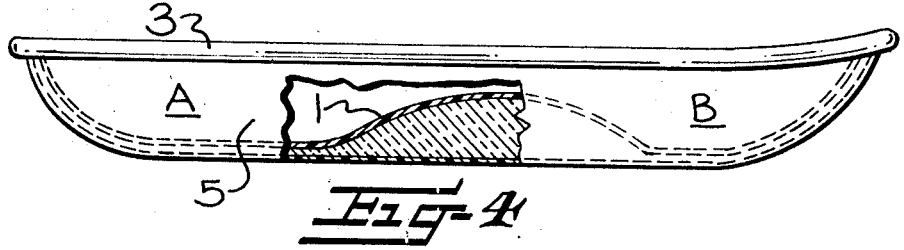
FIG. 4 is a side elevation of a further modified embodiment of the sled which is of the integral type having a double bottom with a portion broken away and parts shown in section.
Figure 5:
FIG. 5 is an elongated fragmentary sectional view illustrating a form of transverse ribs illustrated in the center portion of FIG. 1.
Figure 5A:
FIG. 5a is a view similar to FIG. 5 illustrating a modified form of transverse ribs which may be employed with the sled of the present invention.
Figure 6:
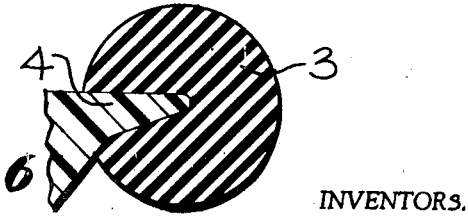

Generally the object of the invention is a rectangular sled or sleigh made of plastic material and having the general shape of a trough having raised, curved forward and rear portions and opposed raised sidewalls. Within the trough there is provided a hump 1 which may be a separate insert (FIG. 1), or a raised portion of the bottom portion proper (FIG. 3) or an upwardly domed double bottom (FIG. 4) the member being made from any suitable type of resilient material such as plastics, rubber or the like. An annular rim 3 of shock-absorbing material is provided around the edge of the sled for the purpose of reducing the risk of damage inflicted to other children due to collisions. While riding the child is occupying the seat portion A while the feet are placed in zone B, the legs in this case being angularly deflected over hump 1. Thus, due to the hump 1 the child is compelled to sit with the legs flexed in the knee joint whereby the risk of thrusts acting in the longitudinal direction of the legs is eliminate and thereby the main drawback of conventional sled types is removed. The hump 1 may be provided with corrugations 2 for the purpose of increasing the friction between the seat zone of the sled and the occupant and thereby to reduce the speed of forward movement during collision. As appears from FIGS. 1 and 2 the hump may be a separate insert, adapted to be placed in a conventional sled and to be attached to the bottom thereof by any suitable attaching means. In an integrally manufactured sled the hump may take the shape of a double bottom as shown in FIG. 4, the space between the lower bottom of the sled and the upper bottom layer in this case preferably being filled with any suitable shock absorbing and insulating material. The hump may also be an upwardly domed portion of the bottom portion proper as shown in FIG. 3. By adding shock absorbing and insulating material consideration is given to two further safety-promoting factors by providing, on the one hand, a shock-absorbing effect when the sled due to a bump exerts an upward thrust in the direction of the vertebral column of the child, such thrust involving risk of vertebral fractures as mentioned above and, on the other hand, a heat-insulating effect which is a factor of great importance because children sitting in ordinary sleds of plastic are often subject to cold injuries.

The sled according to the present invention thus considerably reduces the risk factors involved in conventional plastic sleds. The invention is not restricted to the various embodiments shown but comprises any variation and modification thereof within the scope of the appended claims.

What We claim is:

1. A plastic riding sled for children having provision for forcing the rider to sit with flexed legs to thereby reduce the risk of fractures due to longitudinal thrusts comprising:
   a generally rectangular flat bottom surface bounded by raised side, front and rear walls defining a substantially coplanar upper edge, said sidewalls extending substantially vertically from said bottom wall, said upper edge including a peripheral flange extending outwardly from said walls, and an annular rim of shock-absorbing material secured to at least a portion of said upper edge, and
   an arcuately curved hump secured to said bottom surface intermediate said front and rear walls, said hump curving from front to rear and extending continuously from side to side, at least a portion of said hump being corrugated to increase the friction between the hump and a rider.

2. A plastic riding sled for children having provision for forcing the rider to sit with flexed legs to thereby reduce the risk of fractures due to longitudinal thrusts comprising:
   a generally rectangular flat bottom surface bounded by raised side, front and rear walls defining a substantially coplanar upper edge, said sidewalls extending substantially vertically from said bottom wall, said upper edge including a peripheral flange extending outwardly from said walls, and
   a second bottom surface overlying the full area of said flat bottom surface, said front wall, and said rear wall to define a double bottom, said second bottom surface including an arcuately curved hump intermediate said front and rear walls, said hump curving from front to rear and extending continuously from side to side.

3. The sled as defined in claim 2 wherein shock-absorbing material is positioned between said second bottom surface and said flat bottom surface.